T. BROWN.
MOWER.
APPLICATION FILED OCT. 27, 1914.
1,270,491.
Patented June 25, 1918.
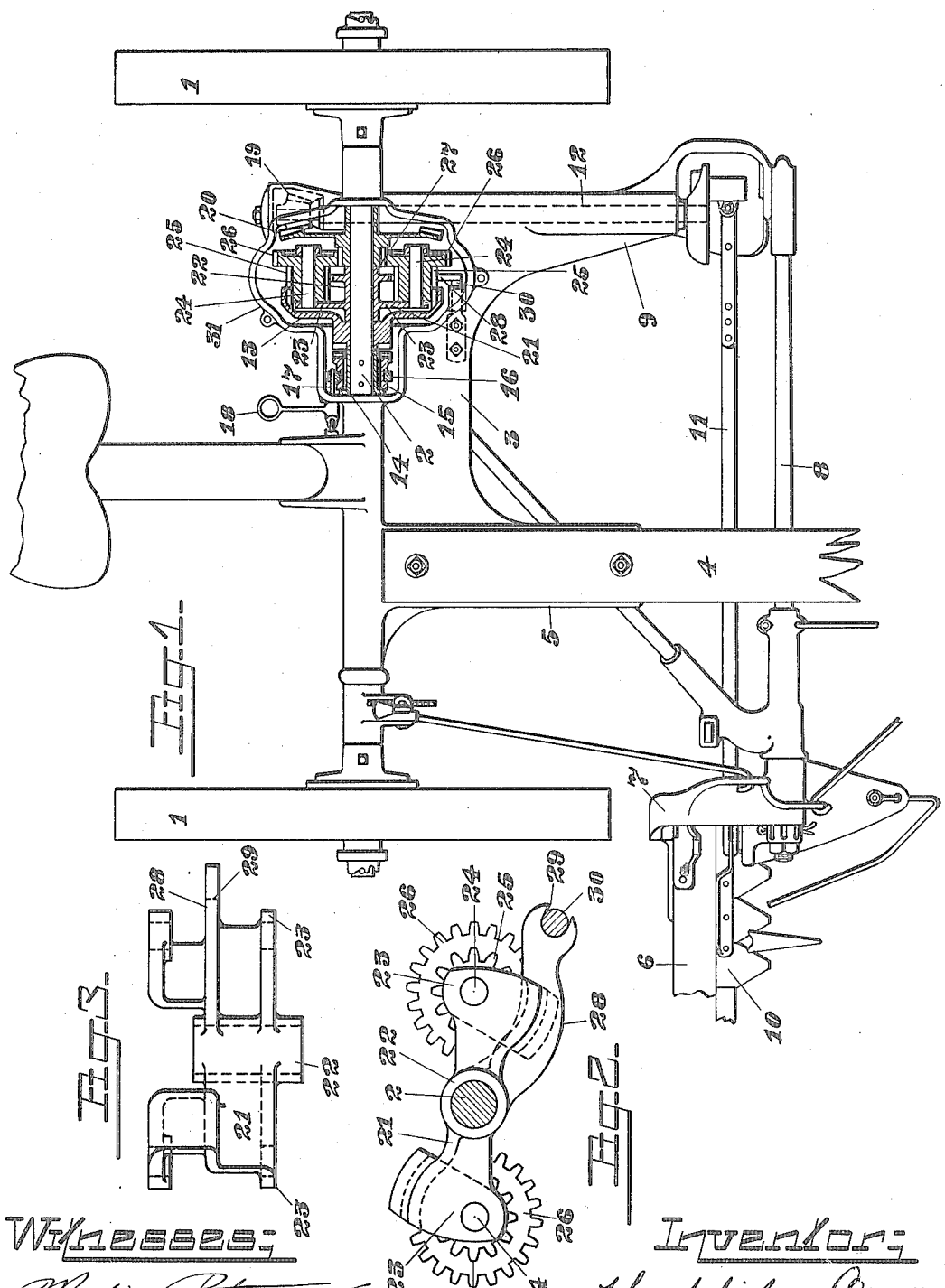

UNITED STATES PATENT OFFICE.

THEOPHILUS BROWN, OF MOLINE, ILLINOIS, ASSIGNOR TO DEERE & COMPANY, OF MOLINE, ILLINOIS, A CORPORATION OF ILLINOIS.

MOWER.

1,270,491.       Specification of Letters Patent.     Patented June 25, 1918.

Application filed October 27, 1914. Serial No. 868,870.

*To all whom it may concern:*

Be it known that I, THEOPHILUS BROWN, a citizen of the United States, residing at Moline, in the county of Rock Island and State of Illinois, have invented certain new and useful Improvements in Mowers, of which the following is a specification, reference being had therein to the accompanying drawing.

My invention relates to harvesting machinery, particularly to that type of mowing machines in which the cutter is operated by power from the ground wheels transmitted through gearing mounted on the axle. My object being to provide an effective gearing which can be readily controlled.

Referring to the drawings in which similar numerals indicate identical parts—

Figure 1 is a plan view of a mower embodying my invention, showing the top of the gear case removed and the gearing in section.

Fig. 2 is an enlarged detail view of a member and certain parts of the gearing supported thereon, and Fig. 3 is an enlarged plan view of said member.

Supporting wheels 1 are mounted upon an axle 2 and are connected therewith in a well known manner in order that the forward rotation of the wheels will impart a similar movement to the axle. The frame 3 is supported upon the axle 2, the rear of the frame being tubular to form a suitable bearing in which the axle 2 revolves. A draft pole 4 is attached to a forwardly projecting portion 5 of the frame 3. The cutting device consists of a knife or cutter bar 6 hinged to a yoke 7 pivotally mounted on the grassward end of a drag bar 8, the latter being pivotally connected to a forwardly extended portion 9 of the frame 3. A knife or cutter 10 of an ordinary construction is supported on the cutter bar 6 and is reciprocated by a pitman 11 connected thereto and to a crank end of a crank shaft 12 journaled in the portion 9 of the frame 3.

Loosely mounted on the axle 2 is an internal gear 13 the hub of which forms part of a clutch by which power is transmitted from the axle 2 for simultaneous rotation of the latter and the internal gear 13, the clutch comprising a sleeve 14 permanently secured to the axle 2 and having slidably mounted thereon a part 15 having teeth to engage with similar teeth on the end of the hub of the internal gear 13; a collar 16 is loosely mounted in a groove in the part 15 and is connected to a rod 17 the latter being operated by a lever 18 to slide the part 15 to engage or disengage the teeth thereon and the teeth on the hub of the internal gear 13. I make no claim to a clutch of this description as it is well known in the art and its operation fully understood.

Rigidly mounted on the rear end of the crank shaft 12 is a bevel pinion 19 meshing with a bevel gear 20 loosely mounted on the axle 2; also loosely mounted on the axle 2 between the bevel gear 20 and the internal gear 13 is a member 21 having a hub 22; projecting from opposite sides of the hub 22 are bearings 23 in which are supported short shafts 24; on each shaft 24 is mounted a gearing consisting of a pinion 25 meshing with the internal gear 13, and a gear 26 preferably integral with the pinion 25 and meshing with a pinion 27 formed on the hub of the bevel gear 20. Extending from one side of the hub 22 is an arm 28 having a notch 29 with which a stop 30 is in constant engagement, the stop 30 being bolted or otherwise rigidly secured to the frame 3 and projecting through the wall of a gear case 31 the top of which has been removed.

To transmit power to the cutter I operate the lever 18 to move the part 14 of the clutch to engage the teeth thereon with the teeth on the hub of the internal gear 13, and as the clutch is secured to the axle 2 and constantly revolves therewith, motion is transmitted to the internal gear 13. The stop 30 holds the member 21 against rotation, consequently the rotation of the internal gear 13 actuates the pinions 25 meshing therewith and the gears 26 which are enmeshed with the pinion 27 on the hub of the bevel gear 20, and as the latter engages with the bevel pinion 19 on the crank shaft 12, the pitman 11 connected therewith is actuated to operate the cutter 10. It is apparent that by disconnecting the part 14 and the hub of the internal gear 13 by proper operation of the lever 18, the intermeshed gears will become idle and no power from the ground wheels 1 will be conveyed to the cutter.

I do not limit myself to the type of clutch shown, or to the type of stop illustrated and described as others may be used without lessening the scope of my invention.

What I claim is—

In a mowing machine, the combination of a frame, an axle journaled thereon having supporting wheels with which it revolves in a forward direction, a reciprocating cutter, a crank shaft to operate the cutter, a bevel pinion on the crank shaft in constant mesh with a bevel gear loosely mounted on the axle, an internal gear loosely mounted on the axle, a member loosely mounted on the axle, an arm extending from said member and in constant engagement with a stop on the frame to hold said member in a fixed position against rotation, a plurality of gears supported on said member and in constant engagement with the internal gear and a pinion on the bevel gear, and a clutch secured on the axle to revolve therewith, said clutch being operable at will to connect the internal gear and axle to transmit power from the latter to the cutter.

In testimony whereof I affix my signature in presence of two witnesses.

THEOPHILUS BROWN.

Witnesses.
W. G. DUFFIELD,
JESSIE SIMSER.